United States Patent [19]

Truax

[11] Patent Number: 4,977,841

[45] Date of Patent: Dec. 18, 1990

[54] TORSIONAL JOINT ATTACHMENT FOR A SEED PLANTER

[76] Inventor: James R. Truax, 3717 Vera Cruz Ave. N., Minneapolis, Minn. 55422

[21] Appl. No.: 444,277

[22] Filed: Dec. 1, 1989

[51] Int. Cl.$^5$ .......................... A01C 5/06; A01B 35/28
[52] U.S. Cl. ....................................... 111/62; 172/711; 172/739; 172/763; 111/926; 111/164; 111/84
[58] Field of Search ............... 172/710, 711, 705, 264, 172/265, 40, 763, 734, 737, 739, 740; 111/84, 69, 66, 62, 164–169, 926, 60

[56] References Cited

U.S. PATENT DOCUMENTS

| | | | |
|---|---|---|---|
| 1,681,423 | 8/1928 | Monsarrat | 172/739 |
| 3,414,252 | 12/1968 | Frager et al. | 172/711 X |
| 3,575,243 | 4/1971 | Mark | 172/710 |
| 4,030,428 | 6/1977 | Truax | 111/85 |
| 4,251,014 | 2/1981 | Salley et al. | 111/69 X |
| 4,579,071 | 4/1986 | Johnson | 111/85 |

FOREIGN PATENT DOCUMENTS

| | | | |
|---|---|---|---|
| 1037765 | 9/1978 | Canada | 172/705 |
| 1657645 | 11/1969 | Fed. Rep. of Germany | 172/763 |
| 2028159 | 12/1970 | Fed. Rep. of Germany | 172/705 |
| 2590108 | 5/1987 | France | 172/763 |
| 1274219 | 5/1972 | United Kingdom | 111/84 |
| 2148084 | 5/1985 | United Kingdom | 172/763 |
| 8505246 | 12/1985 | World Int. Prop. O. | 111/926 |

OTHER PUBLICATIONS

Deutz–Allis Brochure for Field Cultivators, Dentz–Allis Corp., P.O. Box 933, Milwaukee, Wis.

Primary Examiner—Danton D. DeMille
Attorney, Agent, or Firm—Burd, Bartz & Gutenkauf

[57] ABSTRACT

A seed drill machine of the type having a plurality of disk assemblies, and a torsion spring joint for connection of the disk assemblies to the frame of the machine. The machine is conventionally mounted on a pair of wheels and the disk assemblies can be raised and lowered relative to the wheels for travel from place to place in the raised position and for ground working in the lowered position. In the lowered position, the torsion spring joint biases the disk blades in penetrating engagement with the soil to form a furrow. The torsion joints include flexible, resilient type spring elements. The disk assembly is carried by an arm connected to the joint. The spring elements are prone to develop a permanent deflection when they are left under load for a period of time. Means are provided for adjusting the angular relationship of the disk assembly arms to the connecting joints to compensate for such deformation.

26 Claims, 4 Drawing Sheets

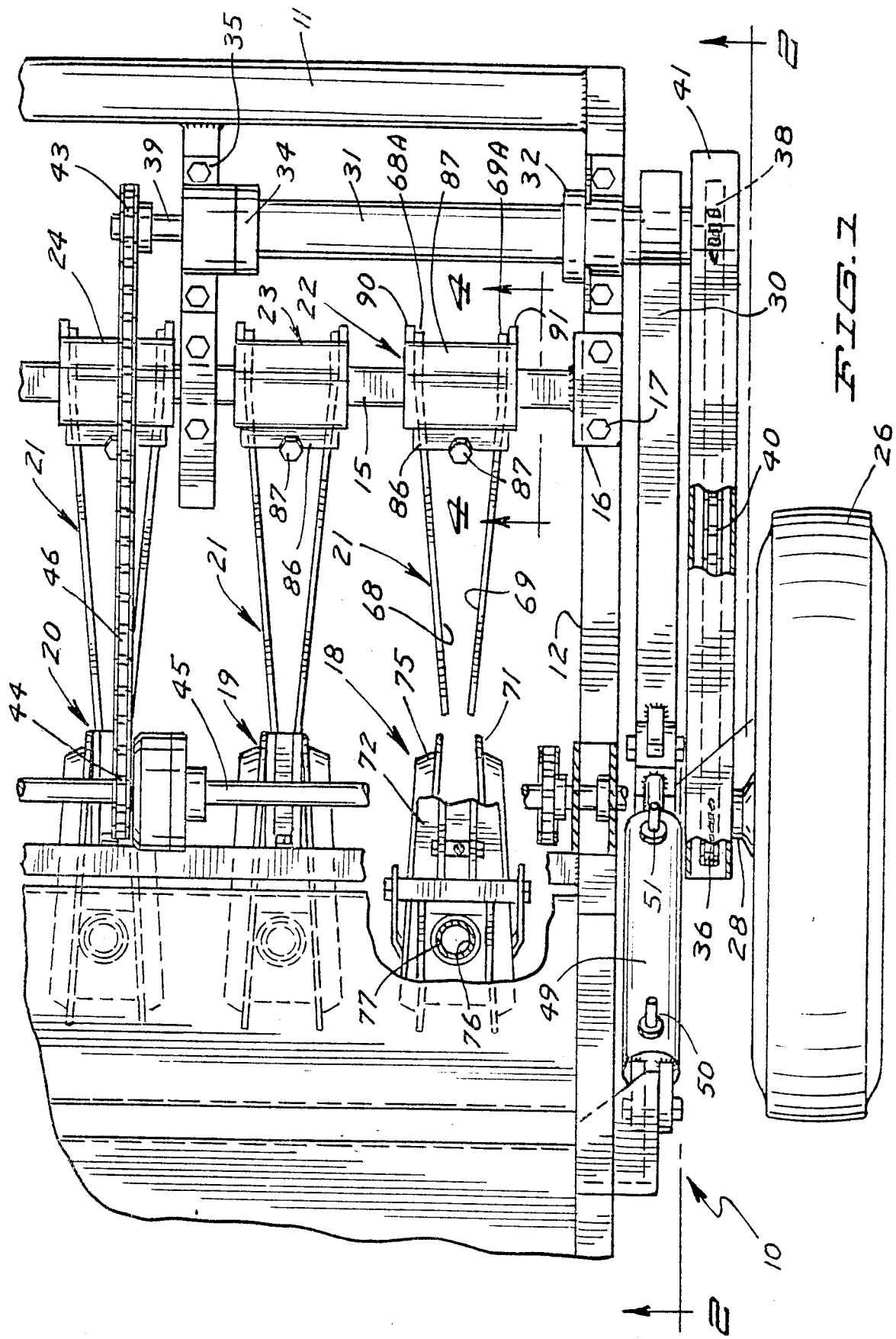

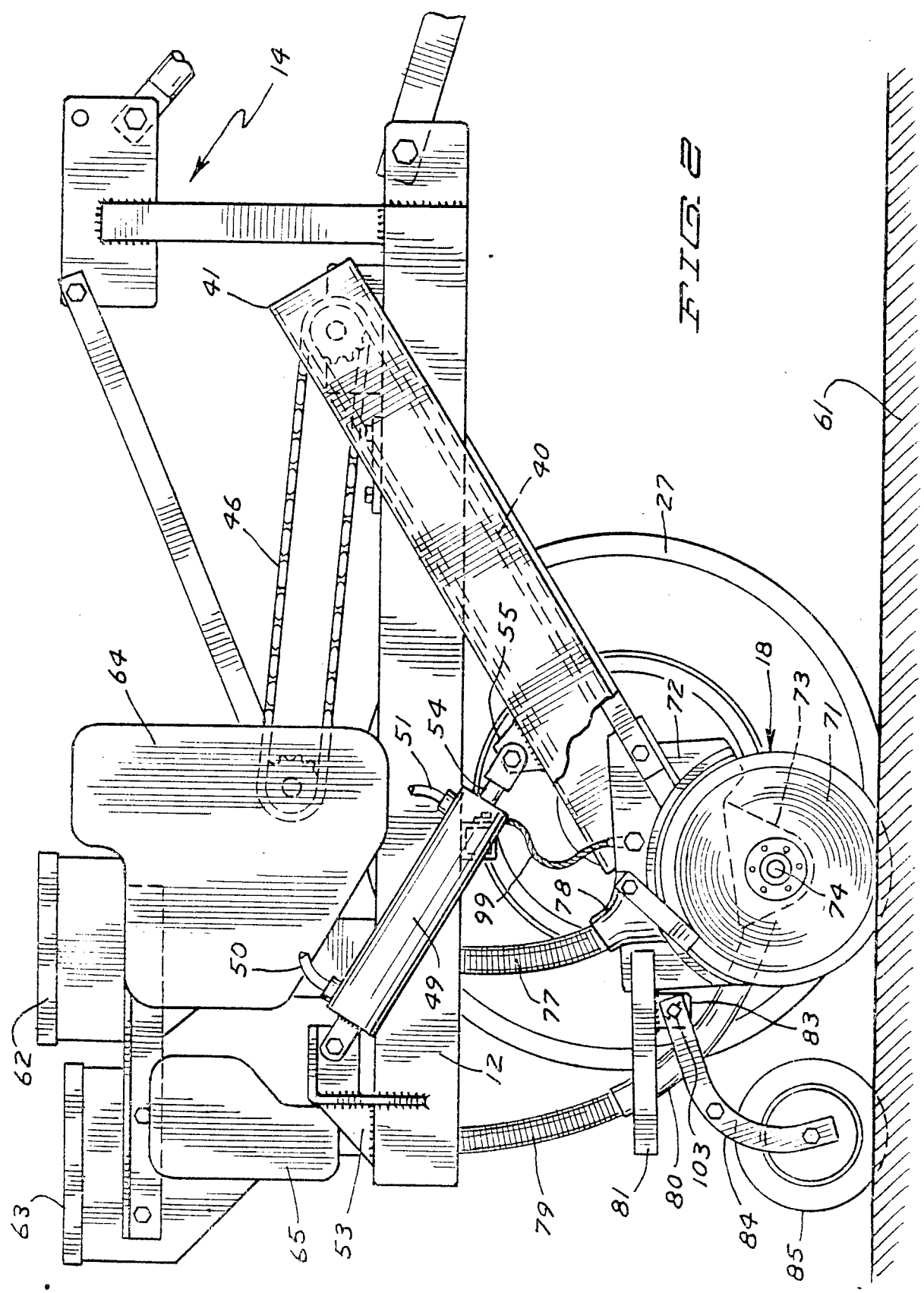

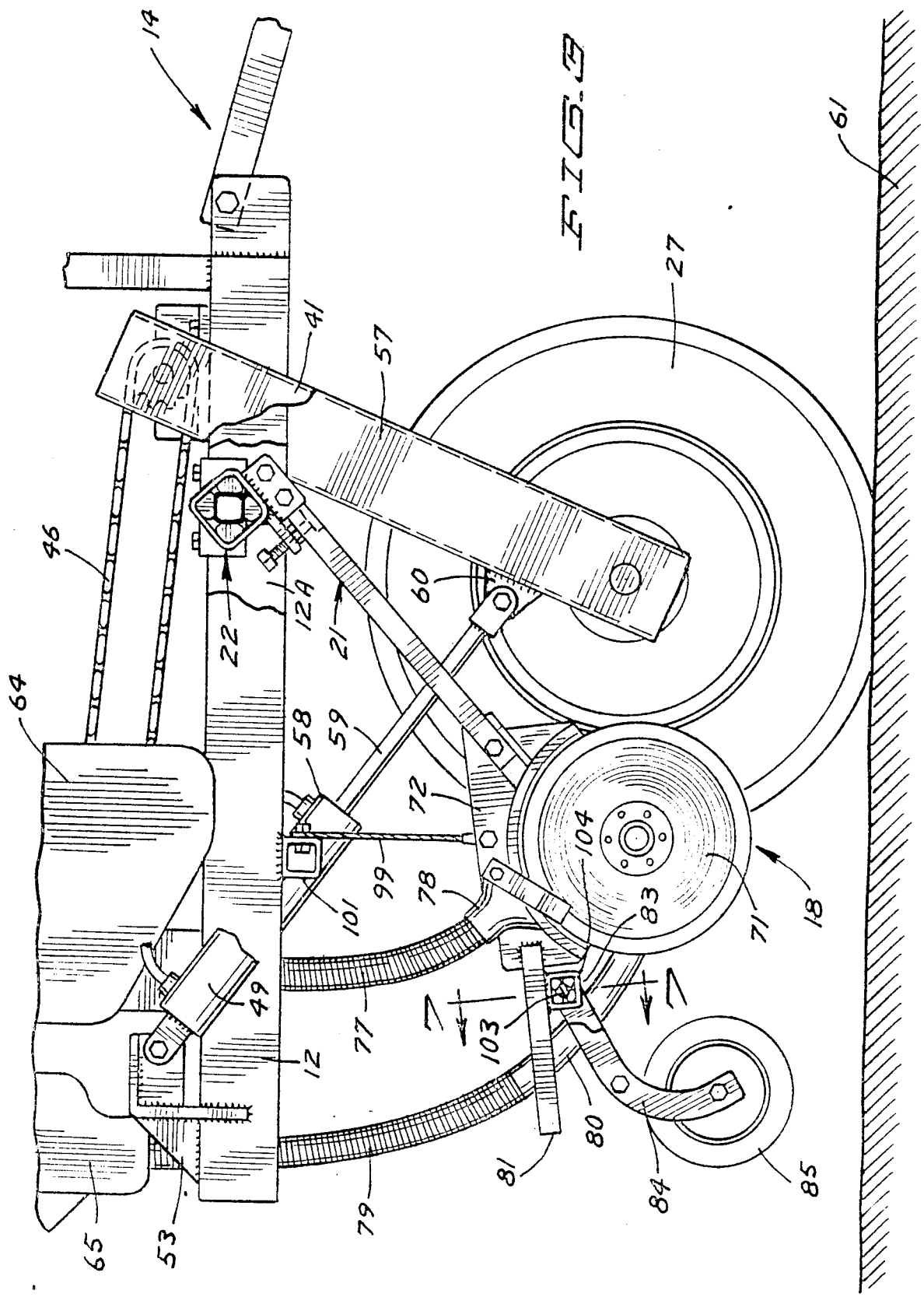

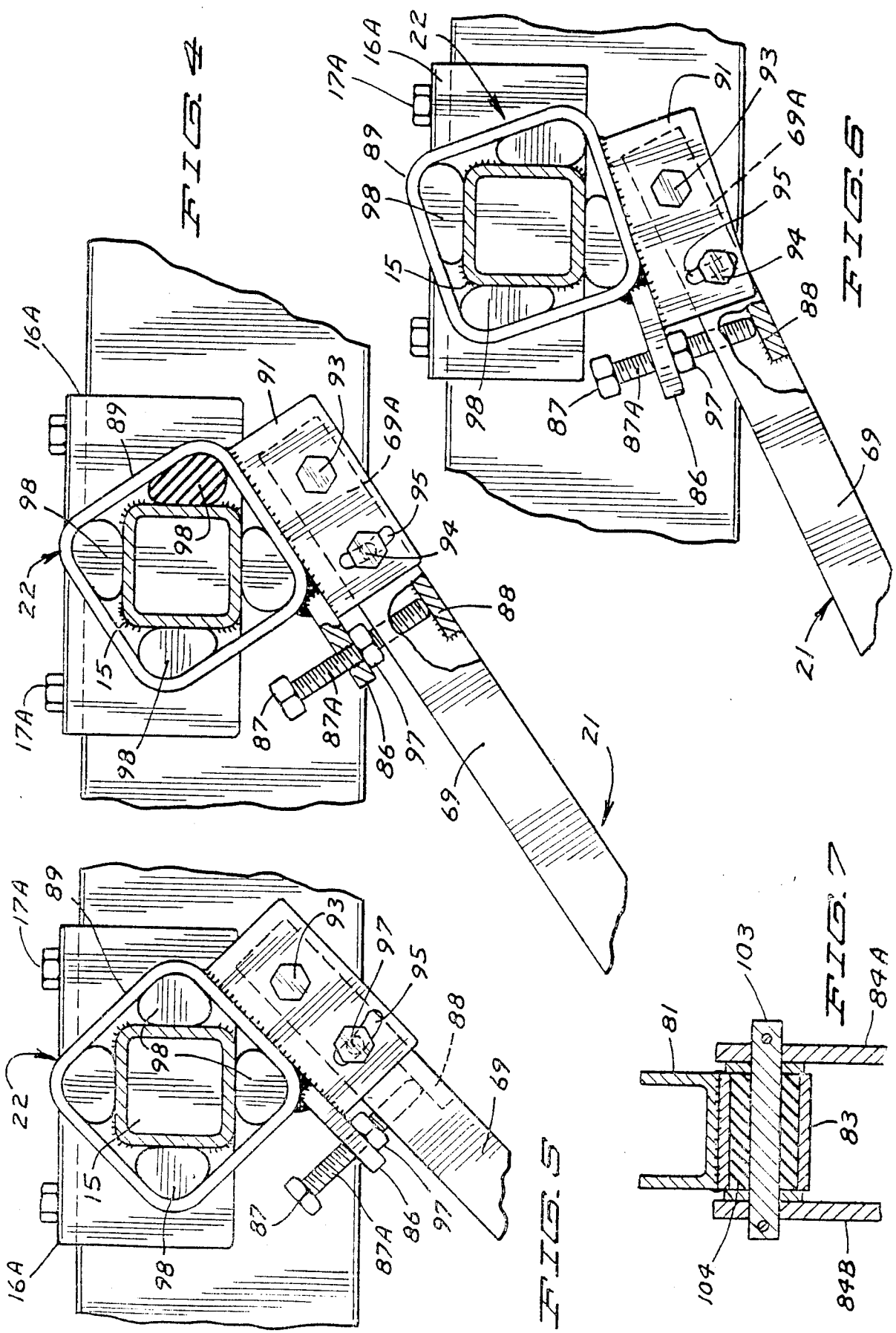

TORSIONAL JOINT ATTACHMENT FOR A SEED PLANTER

BACKGROUND OF THE INVENTION

Planters or seed drills have disk assemblies for continuously opening a furrow for deposit of seed. For example, see U.S. Pat. No. 4,030,428 to Truax issued June 21, 1977. The disk assemblies are commonly held in furrowing relationship to the ground by spring loaded pressure rod assemblies. A pressure rod bar has a lower end assembled to the disk assembly. The upper end engages a pressure rod arm and is free to move. A compression spring bears between the pressure rod arm at the upper end and the disk assembly at the lower end, biasing the disk assembly down but permitting upward deflection upon encountering an obstacle. The pressure rod assembly type of system requires periodic maintenance and replacement of numerous parts.

SUMMARY OF THE INVENTION

The invention pertains to an agricultural implement and in particular a seed drill or planter of the type having array of disk assemblies for forming furrows in a field for deposit of seed, and subsequent closing and compacting of the furrow by means of a press wheel assembly. The machine includes a frame mounted on a pair of wheels and carrying the disk assemblies. The disk assemblies can be raised and lowered with respect to the wheels. The raised position is for transport and storage of the machine. The disk assemblies are lowered relative to the wheels for working. In the lowered position, the weight of the machine is distributed between the wheels and the disk assemblies with most of the weight being borne by the disk assemblies such that the disk blades penetrate the ground a predetermined depth to form the furrow. Each disk assembly is connected to a torque arm that is assembled to the frame by a torsion joint that includes torsion spring elements formed of an elastomer type material such as urethane, neoprene, butyl or similar type material. The torsion joint presses the disk assemblies into the ground and permits resilient deflection of the disk assemblies when an obstacle is encountered. An elastomer type material is normally prone to develop a permanent "set" if retained in a distorted configuration for a length of time. This can result in a permanent deflection of the disk assembly relative to the frame. An adjustment is provided on the disc assemblies for compensating deflection caused by such a permanent set.

IN THE DRAWINGS

FIG. 1 is a top plan view of a portion of a seed drill according to the invention with sections broken away for purposes of illustrations;

FIG. 2 is side elevational view of a portion of the seed drill of FIG. 1 showing the ground working equipment lowered with respect to the wheels and in ground engagement;

FIG. 3 is a side elevational view of a portion of the seed drill of FIG. 1 showing the ground working equipment elevated with respect to the wheels and with sections broken away for puposes of illustration;

FIG. 4 is an enlarged sectional view of a portion of the seed drill of FIG. 1 taken along the line 4—4 thereof to show a disk assembly attachment joint according to the invention in a flexed or deflected condition;

FIG. 5 is a view of the attachment joint of FIG. 4 showing the attachment joint in a relaxed condition;

FIG. 6 is view of the attachment joint showing the spring element in a permanantly deformed or set condition with the angular orientation of the disk holding arms having been adjusted to compensate for the set of the spring elements; and FIG. 7 is an enlarged sectional view of a portion of the press wheel assembly shown in FIG. 2 taken along the line 7—7 thereof.

DESCRIPTION OF A PREFERRED EMBODIMENT

Referring to the drawings, there is shown in FIG. 1 a portion of a seed drill machine 10 having a frame that includes a forward lateral frame member 11 and a right longitudinal frame member 12. Machine 10 has corresponding left side frame member (12A) and rear frame member (not shown) to form a composite strong frame for the mounting of other equipment. Draw bar equipment 14 (FIG. 2) extends ahead of front frame member 11. A disk assembly support or mounting bar 15 is laterally oriented and spaced behind the forward frame bar 11 in parallel relationship to it. Mounting bar 15 extends the width of the frame and is fixedly assembled to the side frame members by end clamps 16, 16a secured by bolts 17, 17a. Machine 10 includes a plurality of disk assemblies mounted laterally in side-by-side relationship on disk assembly mounting bar 15. Disk assemblies 18, 19, 20 are connected to mounting bar 15 by a plurality of torque arms 21 fastened to torsion joints 22, 23, 24.

The frame of machine 10 is supported by wheels and by mechanism for elevating and lowering the wheels with respect to the frame in order to move the ground engaging equipment into and out of engagement with the ground. A right wheel 26 is shown in FIG. 1 and a left wheel 27 in FIGS. 2 and 3 (where the right wheel is removed for purposes of illustration). Each wheel is rotatably assembled to one end of a mounting leg. The other end of the mounting leg is rotatably assembled to the frame. A hydraulic actuator or motor is assembled between each mounting leg and the frame to move the leg in and the wheel up and down relative to the frame.

In FIG. 1, the wheel 26 is shown mounted on a short axel 28 rotatably assembled to one end of a mounting leg 30. The other end of mounting leg 30 is assembled in perpendicular relationship to the outboard end of a tubular shaft 31. Shaft 31 is carried by an outboard bearing assembly 32 secured to side frame member 12, and an inner bearing assembly 34 secured to a longitudinal brace 35. Brace 35 is secured between front frame member 11 the intermediate frame member 15. Right wheel 26 is moved up and down relative to the machine frame upon rotation of mounting leg 30 on shaft 31 carried by bearing assemblies 32, 34.

Right wheel 26 is also a drive wheel to operate the seeder mechanism of seed drill 10 to distribute seed in furrows formed by the disk assemblies as machine 10 is advanced over a field under two. Axial 28 carries a first sprocket 36 outboard of the connection to the wheel mounting leg 30. A second sprocket 38 is carried on a rod 39 which is rotatably mounted in tubular shaft 31 and has an end extending outboard of the shaft 31. A drive chain 40 is trained over the first and second sprockets 36, 38 and is covered by a suitable chain guard housing 41. A third sprocket 43 is mounted on the inboard end of the rod 39 that extends outwardly from the inboard end of the shaft 31. A fourth sprocket 44 is carried on a seeder mechanism drive shaft 45 that is rotatably mounted between the side frame members at a location over the disk assemblies. A second drive chain 46 is trained over the third and fourth sprockets 43, 44. The seed mechanism drive shaft 45 is connected by suitable gearing arrangement (not shown) to drive the seeder agitator mechanisms. Exemplary of such mechanisms are the type shown in U.S. Pat. No. 4,030,428 issued June 21, 1977 to Truax. Rotation of wheel 26 as machine 10 travels over the ground is effective to rotate sprocket 36 and second sprocket 38 through drive chain 40. Shaft 39 rotates the third and fourth sprockets 43, 44 which drives shaft 45 to operate the seeder mechanism.

As shown in FIGS. 1 and 2, a reciprocating hydraulic motor 49 of the piston-cylinder variety is mounted between the right wheel mounting leg 30 and the right side frame member 12 for purposes of extension and retraction of the right wheel 26 relative to the frame of machine 10. Hydraulic motor 49 derives hydraulic fluid for reciprocation from a remote hydraulic fluid source (not shown) through hydraulic fittings 50, 51. A bracket 53 is fixed to the side frame member 12 at a rearward location. The cylinder end of hydraulic motor 49 is pivotally connected to the bracket 53. A boss 55 is connected to the mounting leg 30. The rod 54 of the hydraulic motor 49 is pivotally connected at its outward end to the boss 55.

The left wheel 27 is similarly connected for extension and retraction. In FIG. 3, portions of the equipment on the right side have been broken away in order to illustrate the mechanism on the left side. The left wheel 12 is rotatably mounted on a left wheel mounting leg 57. A hydraulic motor 58 has a rod 59 extendable and retractable relative to the cylinder portion of the motor 58. Rod 59 is connected to a boss 60 located on the left side wheel mounting leg 57. Right and left hydraulic motors 49, 58 are operated simultaneously. Retraction of the cylinder rods 54, 59 relative to the cylinders moves the wheels upwardly to lower the frame relative to the wheels and to a ground surface 61. The lowered configuration is shown in FIG. 2 and the raised configuration in FIG. 3. In FIG. 2 the ground working equipment engages the ground 61. In FIG. 3 the ground working equipment is raised in clearing relationship to the ground 61.

Referring to FIG. 1, disk assembly 18 is connected to the torsion joint 22 by torque arm 21 permitting resilient upward rotational movement of the disc assembly 18 and the arm 21 on the mounting bar 15. The arm 21 includes a pair of arm members 68, 69 that are fastened at one end to the joint 22 and extend from it in convergent relationship. The opposite ends of the arm members 68, 69 are connected to the disk assembly 18.

Disk assembly 18 includes a pair of circular disks or blades 71 disposed in spaced relationship with forward edges converging toward one another. The upper edges of the blades 71 are accommodated by a planting shoe 72. Planting shoe 72 has a downwardly extending leg 73 (FIG. 2) on which blades 71 are rotatably mounted. Each blade 71 has a side flange 75 spaced inward from the outer peripheral edge thereof which effectively limits the depth of furrow formed by the disk assembly 18 by limiting the depth of penetration of blades 71. Arm members 68, 69 are secured to the planter shoe leg 73 between the blades 71.

A seed hose 77 from forward seed hopper 62 connects to a seed drop snout 78 on planter shoe 72 for dropping seed into the furrow formed by the blades 71.

A second seed hose 79 extends from the second hopper 63 to a seed tube 80 which is mounted on a press wheel mounting member 81 connected to planter shoe 72. The lower end of the seed tube 80 is positioned for deposit of a second seed between the blades 71 in the furrow formed thereby.

As shown in FIGS. 1 and 4, the joint 22 includes a rectangular or square housing 89 mounted in generally diagonal relationship to mounting bar 15. Housing 89 is comprised of a single piece but could be constructed of two pieces clamped together. Mounting bar 15 is square with vertical and horizontal sides. The sides of housing 89 are inclined. Downwardly depending, paralled spaced apartt side plates 90, 91 are fixed to the lower, rewardly inclined surface of housing 89. The upper end portions 68A, 69A of arm members 68, 69 are located between and are closely straddled by the side plates 90, 91. As shown in FIG. 4, a front bolt 93 secures the end 69A of arm member 69 to the side member 91. A second bolt 94 is spaced rearwardly of the first bolt 93. It also connects the end 69A of arm member 69 to the side plate 91 and is mounted in an arcuate slot 95 in side plate 91. Slot 95 is arcuate about a radius with a center generally at bolt 93 such that arm member 69 is pivotal about bolt 93 and accordingly side plate 91 and housing 89, by an amount governed or limited by the boundaries of slot 95. The opposite arm member 68 is similarly mounted relative to the opposite side plate 90. Limited pivotal positioning of arm 21 from a first angular position toward a second angular position relative to housing 89 is accomplished by loosening bolts 93, 94 and moving the arm relative to the housing, then tightening the bolts on both sides.

A bearing plate 86 is fixed to housing 89 as by being welded to rearward upper edge portions of side plates 90, 91. Bearing plate 86 extends over the portion of leg 21 immediately adjacent housing 89 and just behind the second mounting bolt 94. A support platform 88 is fixed to and extends between leg members 68, 69 in spaced apart, facing relationship to bearing plate 86. An adjusting member or bolt 87 has a threaded shank 87A passing through a threaded opening in bearing plate 86 and with its end in surface contact with platform 88. Shank 87 passes through and threadably engages a retaining nut 97 located adjacent bearing plate 86 on the surface opposite the head of bolt 87.

Mounting bar 15 and housing 89 are both flat sided polygonal members shown as rectangular in cross sectional shape. Housing 89 has inside demensions greater than the outside dimensions of mounting bar 15 and spans a segment of mounting bar 15. Housing 89 is diagonally oriented with respect to mounting bar 15 such that the inside corners of housing 89 generally face flat surfaces of mounting bar 15. Housing 89 containes a spring formed of an elastomer-type material. A plurality of bar-like torsion spring elements 98 are closely lodged between housing 89 and mounting bar 15. As shown, four torsion spring elements 98 are installed in joint 22. Each spring element is installed in an interior corner of housing 89 in snug relationship between the corner and an opposing flat surface of mounting bar 15 substantially filling the space therein. Each torsion spring element is formed of a resilient, strong plastic or rubber material which is resiliently deflectable under load. The spring elements are of a length to span the width of housing 89. A flexible elastomer type material such as urethane, neoprene, butyl or similar material is preferred for the characteristics of resiliency, high compression strength and resistance to outdoor elements. The elastomer preferably has an elasticity characteristic of approximately 70-80 durometer hardness. In a preferred embodiment, spring elements 98 have a cylindrical undeflected shape. Housing 89 is square with an inside side-to-side dimension of approximately 2.7 times the diameter of a spring element 98. The housing 89 has rounded interior corners with a radius of two-thirds the diameter of a spring element 98. The outside side-to-side dimension of square mounting bar 15 is equal to approximately 1.8 times the diameter of a spring element.

FIG. 3 shows the carrying wheels lowered with respect to the frame of machine 10 whereby the ground engaging equipment is raised above the ground 61. A transverse beam 101 is fixed laterally between the side frame members of machine 10 at a location above the disk assemblies. A linear, flexible support member such as chain or wire rop cable 99 is fixed at one end to the beam 101 and at the other end to planting shoe 72 of disk assembly 18. Cable 99 can provide support to the disk assembly 18 above the ground 61 when in the elevated position of FIG. 3. Cable 99 is of a length to indicate, when taut, the proper position of disc assembly 18 relative to mounting bar 15 when in the relaxed or unloaded condition. Alternately, cable 99 can pre-load the torsion joint 22 by holding it in a deflected state prepatory to ground engagement.

A press wheel 85 as shown in FIGS. 1 and 2, is rotatably assembled to a press wheel axel assembly 84 which is secured to the ends of a press wheel assembly shaft 103. Shaft 103 is retained in a press wheel joint housing 83 which is secured as by welding to the press wheel mounting member 81. As shown in FIG. 7, the axel assembly 84 has parallel spaced apart arms 84A, 84B which are assembled to the press wheel assembly shaft 103. The legs 84A, 84B straddle the press wheel joint housing 83. The press wheel joint housing 82 contains a flexible torsion spring 104 comprised of a flexible, resiliant plastic or rubber type material. The shaft 103 passes through a suitable opening provided in the torsion spring 104. Torsion spring 104 can be chosen of an elastomer type material for the same purpose as spring elements 98. The press wheel axel assembly 84 is deflectable with the shaft 103 relative to the housing 83 by virtue of resilient deflection of the torsion spring 104. When the disk assembly 18 is in ground engagement, the torsion spring 104, is effective to keep a spring force upon the press wheel 85 to bias it in engagement with the ground.

Elastomer-type materials function well as spring and cushion members with the disadvantage that they develop a permanent set or distortion when retained under conditions of loading over a period of time. In FIGS. 3 and 5, the torsion spring elements of disk assembly joint 22 are in a substantially neutral, relaxed and undeflected condition. Rods 54, 59 of hydraulic motors 49, 58 are extended, raising the frame of machine 10 relative to the machine wheels 26, 27. The ground working equipment is clear of the ground for travel from place to place or simply for storage when the machine is not in use. Disk assembly 18 can be partially supported by cable 99 and the torsion spring joint is relaxed or under a slight pre-load by cable 99.

FIG. 2 shows the wheels 26, 27 retracted relative to the frame of machine 10. This is accomplished by retraction of rods 54, 59 of hydraulic motors 49, 58 through operation of hydraulic controls (not shown) which will usually be located at the tow vehicle. This is also the condition of FIG. 4. The weight of machine is borne by both the wheels and the disk assemblies, but mostly by the disk assemblies with the blades 72 penetrating the earth 61 by a depth up to the flanges 75. Right wheel 26 is a drive wheel and, upon rotation under tow, operates the seeder mechanisms through drive chains 40, 46 to distribute seed from hoppers 62, 63. The disk assembly as shown in FIGS. 2 and 4 is spring loaded with respect to the frame of machine 10. The disk assembly 18 is deflected upwardly by deflection of the leg 21 on joint 22 relative to the disk assembly support bar 15 such that the blades 71 are pressed into the ground under the influence of spring elements 98. Disk assembly 18 opens a furrow, seed is dropped through one or both of seed hoses 77, 79, and press wheel 85 closes the furrow.

If the arm 21 is maintained in a deflected state over some period of time, as when the machine 10 is stored without extending the wheels relative to the frame, the torsion spring elements 98 can develop a permanent deformation or set in the deflected state which, in effect, then becomes the new relaxed position. This is the condition shown in FIG. 6. With the torsion spring elements in the deflected state, the arm 21 is no longer pressed into the ground as the torsion elements 98 no longer exert a spring force in that position. This is corrected by making an angular adjustment of the arm 21 relative to the housing 89 to return the arm 21 to the normal undeflected position while the housing 89 is in a new orientation caused by permanent deformation of the spring elements 98. The forward bolts 93 and second bolts 94 securing the arm 21 to the side plates 90, 91 are loosened. The lock nut 97 is also loosened and the bolt 87 is turned to advance the shank 87A downward against the bearing platform 88 and cause rotation of the leg 21 relative to the housing 89. The shank of the second bolt 94 moves in the slot 95 to a new position. This angular deflection is shown by the difference between the angular orientation of the arm 21 relative to the housing 89 in FIGS. 4 and 6. The adjusting bolt 87 is turned to a point where the support cable 99 is taut when the wheels are extended relative to the frame of machine 10. At that point, the lock nut 97 is secured as are the bolts 93 and 94. Upon futher operation of the machine 10, the arm 21 deflects against the bias spring elements 98 from the new position shown in FIG. 6.

The embodiments of the invention in which an exclusive property or privilege is claimed are defined as follows:

1. A seed drill for opening a furrow in the ground and planting seed therein, comprising:
   a frame having lateral sides and forward and rearward ends;
   first and second side wheels assembled to the frame sides;
   a plurality of disk assemblies for engagement with the ground for forming predetermined depth furrows in the ground;
   a disk assembly support bar extended laterally across the frame from side to side and fixed for rotation relative to the frame for mounting the disk assemblies in a side-by-side relationship laterally across the frame;
   a disk assembly mounting arm for each disk assembly, assembled at a first end to the disk assembly and assembled at a second end to the support bar and extending downwardly and rearwardly from the support bar;

a torsion joint connecting the second end of the disk assembly arm to the support bar;

said disk assemblies positioned by the disk assembly arms to be pressed into furrowing engagement with the ground by the torsion joint in order to form planting furrows in the ground upon forward movement of the frame;

a seed hopper mounted transversely on the frame, and a plurality of seed hoses extended from the seed hopper positioned for delivery of seed into furrows opened by the disk assembly;

each said torsion joint including a generally polygonal shaped housing disposed in surrounding and spaced relationship to a segment of the disk assembly support bar;

torsion spring means of an elastomer type material closely lodged between the interior of the housing and exterior surfaces of the support bar, positioned to be compressed upon rotational movement of the housing relative to the support bar;

means pivotally connecting the end of each disk assembly arm to the torsion joint housing permitting angular movement of the arm with respect to the housing from a first angular position with the arm positioning the disk assembly in trailing and furrowing relationship relative to the support bar, and a second angular position forward of the first angular position relative to the housing in order to compensate for permanent set in the torsion spring elements, and means for releasibly securing the second end of the disk assembly arm to the torsion joint housing in selected position.

2. The seed dril of claim 1 wherein: said support bar is square in cross section shape and said torsion joint housing is square and diagonally positioned relative to the support bar.

3. The seed drill of claim 2 including: means to elevate and lower the disk assemblies relative to the wheels for transport over the ground in the elevated position and for ground engagement in the lowered position.

4. The seed drill of claim 2 including: adjustment means for moving the disk assembly arms from the first angular position toward the second angular position in compensating for deformation of the spring elements of the torsion joint.

5. The seed drill of claim 4 wherein: said adjustment means includes a bearing plate fixed to the housing, a platform fixed to the arm, threaded means between the platform and the bearing plate to move the bearing plate and platform apart to move the disk assembly arm toward the second angular position.

6. The seed drill of claim 4 including: means to elevate and lower the disk assemblies relative to the wheels.

7. The seed drill of claim 6 wherein: each wheel is connected to one end of a mounting leg, the opposite end of the mounting leg being pivotally connected to the frame, a linear hydraulic motor with an extendible and retractable rod connected between the frame and the mounting wheel to raise and lower the frame relative to the mounting wheel.

8. The seed drill of claim 7 including: a cross beam extended laterally across the frame above the disk assemblies, and a flexible member corresponding to each disk assembly having one end connected to the cross beam and the other end connected to the disk assembly and of a proper length to indicate a predetermined position of the disk assembly relative to the frame.

9. The seed drill of claim 6 wherein: the means connecting the second end of the disk assembly arm to the torsion spring housing includes first and second side plates secured to the housing in parallel, spaced apart relationship, said disk assembly arm having first and second arm members having ends positioned adjacent the first and second side plates, each side plate and corresponding arm member having a first bolt connecting the side plate and the end of the arm member, said side plate having an arcuate slot behind the first bolt formed about a radius with a center generally at the first bolt, a second bolt passing through the slot and fixed to the arm member end whereby the arm member end whereby the arm member is pivotal relative to the housing about the first bolt as a center and within limits governed by the slot in the side plate, said first and second bolts moveable between tightened positions to secure the arm member relative to the housing, and loosened positions to permit said rotational movement.

10. The seed drill of claim 9 wherein: the adjusting means for moving the disk assembly arm from the first angular position toward the second angular position relative to the housing includes a bearing plate fixed to the housing, a platform extended between the disk assembly arm members and positioned in alignment with the bearing plate, and a threaded adjustment member in threaded engagement between the bearing plate and the platform by threaded means whereby rotation of the threaded adjustment member is effective to move the bearing plate away from the platform and move the disk assembly arm from the first angular position toward the second angular position.

11. The seed drill of claim 10 wherein: said adjusting member is a bolt having a threaded shank engaged in a threaded opening of the bearing plate and having an end in contact with the platform such that rotation of the bolt in direction to advance it relative to the bearing plate moves the platform away from the bearing plate.

12. The machine of claim 11 wherein: means for elevating and lowering the disk assemblies relative to the wheels includes first and second mounting legs, the first and second wheels being rotatably connected to one end of the mounting legs, the other end of the mounting legs being pivotally connected to the frame, first and second linear hydraulic motors connected between the frame and the first and second wheel mounting legs for elevating and lowering the wheels relative to the frame.

13. The seed drill of claim 11 wherein: said torsion spring means includes four equal torsion spring elements having a cylindrical undeflected shape, said housing having a side-to-side inside dimension equal to approximately 2.7 times the diameter of a spring element, said support bar having an outside side-to-side dimension equal to approximately 1.8 times the diameter of a torsion spring element.

14. The seed drill of claim 13 wherein: said housing has rounded interior corners having a radius equal to approximately two-thirds the diameter of a spring element.

15. The seed drill of claim 2 wherein: said torsion spring means includes four equal spring elements having a cylindrical undeflected shape, said housing having a side-to-side inside dimension equal to approximately 2.7 times the diameter of a spring element, said support bar having an outside side-to-side dimension equal to approximately 1.8 times the diameter of a spring element.

16. The seed drill of claim 15 wherein: said housing has rounded interior corners having a radius equal to approximately two-thirds the diameter of a spring element.

17. A machine for forming planting furrows, comprising:
a frame having lateral sides and forward and rearward ends;
first and second side wheels assembled to the frame sides;
a plurality of disk assemblies for engagement with the ground for forming predetermined depth furrows in the ground;
a disk assembly support bar extended laterally across the frame from side to side and fixed from rotation relative to the frame for mounting the disk assemblies in a side-by-side relationship laterally across the frame;
a disk assembly mounting arm for each disk assembly, assembled at a first end to the disk assembly and assembled at a second end to the support bar by a torsion joint;
means for elevating and lowering the disk assemblies relative to the wheels for transport over the ground in the elevated position and for ground engagement in the lowered position;
said disk assemblies positioned by the disc assembly arms to be pressed into furrowing engagement with the ground by the torsion joint when in the lowered position relative to the wheels;
each said torsion joint including a housing in a surrounding and spaced relationship to a segment of the disk assembly support bar;
a plurality of torsion spring elements closely lodged in a corresponding plurality of spaces between interior surfaces of the housing and exterior surfaces of the support bar, positioned to be compressed upon rotational movement of the housing relative to the support bar, said torsion spring elements formed of an elastomer type material whereby the housing is resiliently rotatable relative to the support bar;
means pivotally connecting the second ends of the disk assembly arms to the joint housings permitting limited pivotal movement of the arms relative to the housings between a first angular position and a second angular position relative to the housing to compensate for permanent deformation occuring in the spring elements;
releasable fastening means for securing the arms to the housings;
and adjustment means for moving the arms from the first angular position toward the second angular position in compensating for deformation of the spring elements of the torsion joint.

18. The machine of claim 17 wherein: the torsion joint housing is rectangular and the disk assembly support bar is rectangular in cross sectional shape.

19. The machine of claim 18 wherein: the torsion spring housing is diagonally orientated relative to the support bar, a plurality of four torsion spring elements, one torsion spring element occupying the space between an interior corner of each of the interior corners of the housing and a side of the support bar.

20. The machine of claim 19 wherein: the means connecting the second end of the disk assembly arm to the torsion spring housing includes a side plate fastened to the housing, said second end of the disk assembly arm having a portion adjacent the side plate, a first bolt connecting the side plate and the second end of the disk assembly arm, said side plate having an arcuate slot behind the first bolt formed about a radius with a center generally at the first bolt, a second bolt passing through the slot and fixed to the second end of the disk assembly arm whereby the disk assembly arm is pivotal relative to the housing about the first bolt as a center and within limits governed by the slot in the side plate, said first and second bolts movable between tightened positions to secure the disk assembly arm relative to the housing, and loosened positions to permit said rotational movement.

21. The machine of claim 20 wherein: the adjusting means for moving the disk assembly arm from the first angular position toward the second angular position relative to the housing includes a bearing plate fixed to the housing, a platform connected to the disk assembly arm and positioned in alignment with the bearing plate, and a threaded adjustment member in threaded engagement between the bearing plate and the platform by threaded means whereby rotation of the threaded adjustment member is effective to move the bearing plate away from the platform and move the disk assembly arm from the first angular position toward the second angular position.

22. The machine of claim 19 wherein: the means connecting the second end of the disk assembly arm to the torsion spring housing includes first and second side plates secured to the housing in parallel, spaced apart relationship, said disk assembly arm having first and second arm members having ends positioned adjacent the first and second side plates, each side plate and corresponding arm member having a first bolt connecting the side plate and the end of the arm member, said side plate having an arcuate slot behind the first bolt formed about a radius with a center generally at the first bolt, a second bolt passing through the slot and fixed to the arm member end whereby the member is pivotal relative to the housing about the first bolt as a center and within limits governed by the slot in the side plate, said first and second bolts moveable between tightened positions to secure the arm member relative to the housing, and loosened positions to permit said rotational movement.

23. The machine of claim 22 wherein: the adjusting means for moving the disk assembly arm from the first angular position toward the second angular position relative to the housing includes a bearing plate fixed to the housing, a platform extended between the disk assembly arm members and positioned in alignment with the bearing plate, and a threaded adjustment member in threaded engagement between the bearing plate and the platform by threaded means whereby rotation of the threaded adjustment member is effective to move the bearing plate away from the platform and move the disk assembly arm from the first angular position toward the second angular position.

24. The machine of claim 23 wherein: said adjusting member is a bolt having a threaded shank engaged in a threaded opening of the bearing plate and having an end in contact with the platform such that rotation of the bolt in direction to advance it relative to the bearing plate moves the platform away from the bearing plate.

25. The machine of claim 23 wherein: means for elevating and lowering the disk assemblies relative to the wheels includes first and second mounting legs, the first and second wheels being rotatably connected to one end of the mounting legs, the other end of the mounting legs being pivotally connected to the frame, first and second linear hydraulic motors connected between the frame and the first and second wheel mounting legs for elevating and lowering the wheels relative to the frame.

26. The machine of claim 25 including: a transverse beam connected to the frame sides and extended laterally across the width of the frame at a location over the disk assemblies, a flexible member fixed at one end to the beam at a location over each disk assembly and connected at the other end to the disk assembly, each flexible member of a length to be taut when the disk assembly support arm and torsion joint are in a predetermined position relative to the disk assembly support bar.

* * * * *

UNITED STATES PATENT AND TRADEMARK OFFICE
CERTIFICATE OF CORRECTION

PATENT NO.  :  4,977,841

DATED       :  December 18, 1990

INVENTOR(S) :  JAMES R. TRUAX

Page 1 of 2

It is certified that error appears in the above-identified patent and that said Letters Patent is hereby corrected as shown below:

Col. 1, line 56, "illustrations" should be -- illustration --.

Col. 1, line 57, following "is" insert -- a --.

Col. 2, line 3, following "is" insert -- a --.

Col. 2, line 9, "2" should be -- 3 --.

Col. 2, line 53, following "member" insert --and--

Col. 2, line 59, "two" should be -- tow --.

Col. 2, line 59, "Axial" should be -- Axle --.

Col 4, line 13, "paralled" should be -- parallel --.

Col 4, line 14, "apartt" should be -- apart --.

Col. 4, line 15, "rewardly" should be -- rearwardly --.

Col. 4, line 49, "demensions" should be -- dimensions --.

Col. 4, line 54, "containes" should be -- contains --.

Col. 5, line 18, "rop" should be -- rope --.

Col. 5, line 29, "axel" should be -- axle --.

Col. 5, line 33, "axel" should be -- axle --.

Col. 5, line 43, "axel" should be -- axle --.

UNITED STATES PATENT AND TRADEMARK OFFICE
CERTIFICATE OF CORRECTION

PATENT NO. : 4,977,841

DATED : December 18, 1990

INVENTOR(S) : JAMES R. TRUAX

It is certified that error appears in the above-identified patent and that said Letters Patent is hereby corrected as shown below:

Col. 7, line 33, "drill" should be -- drill --.

Signed and Sealed this

First Day of December, 1992

*Attest:*

DOUGLAS B. COMER

*Attesting Officer*     *Acting Commissioner of Patents and Trademarks*